United States Patent
Makino

(10) Patent No.: US 7,533,165 B2
(45) Date of Patent: May 12, 2009

(54) COMMUNICATION APPARATUS

(75) Inventor: Jun Makino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 850 days.

(21) Appl. No.: 10/733,353

(22) Filed: Dec. 12, 2003

(65) Prior Publication Data

US 2004/0199625 A1 Oct. 7, 2004

(30) Foreign Application Priority Data

Dec. 13, 2002 (JP) ............................. 2002-362278

(51) Int. Cl.
*G06F 15/173* (2006.01)

(52) U.S. Cl. ..................... 709/223; 709/224; 709/217; 709/219

(58) Field of Classification Search ................. 709/223, 709/226, 220, 246, 245, 224, 217, 219; 358/1.15; 370/352, 401, 466

See application file for complete search history.

(56) References Cited

U.S. PATENT DOCUMENTS

| | | | |
|---|---|---|---|
| 6,701,334 B1 | 3/2004 | Ye | |
| 6,762,798 B1 | 7/2004 | Messer et al. | |
| 6,874,145 B1 | 3/2005 | Ye | |
| 6,982,953 B1* | 1/2006 | Swales | 370/218 |
| 6,986,155 B1 | 1/2006 | Courtney | |
| 7,257,812 B1 | 8/2007 | Calder | |
| 7,298,508 B2 | 11/2007 | Furukawa et al. | |
| 2002/0001307 A1* | 1/2002 | Nguyen et al. | 370/386 |
| 2002/0078161 A1* | 6/2002 | Cheng | 709/208 |
| 2004/0111494 A1* | 6/2004 | Kostic et al. | 709/220 |
| 2006/0259183 A1* | 11/2006 | Hayes et al. | 700/221 |

FOREIGN PATENT DOCUMENTS

| | | |
|---|---|---|
| JP | 2000-261516 | 9/2000 |
| JP | 2001-282488 | 10/2001 |
| JP | 2001-309445 | 11/2001 |
| JP | 2003-522442 | 7/2003 |
| WO | WO 01/05158 | 1/2001 |

OTHER PUBLICATIONS

UPnP Device Architecture, version 1.0, Jun. 8, 2000; Microsoft Corp.*
"Universal Plug and Play Device Architecture", Version 1.0, Jun. 8, 2000, pp. 1-64.
"IEEE Standard for a High Performance Serial Bus", published from IEEE (The Institute of Electrical and Electronics Engineers, Inc.), Aug. 30, 1996.
"USB Specification Revision 2.0", Apr. 27, 2000 (with Erratas for Chapters, 5, 6, and 7, USB Engineering Change Notice, and On-The-Go Supplement).

* cited by examiner

*Primary Examiner*—Frantz B Jean
(74) *Attorney, Agent, or Firm*—Fitzpatrick, Cella, Harper & Scinto

(57) ABSTRACT

A communication apparatus includes a plurality of network connection units connected to a network. The communication apparatus (a) notifies an external device of a plurality of IP addresses assigned respectively to the plurality of network connection units so that the external device can select one of the plurality of IP addresses, and (b) releases the plurality of IP addresses except an IP address selected by the external device so that the communication apparatus can provide a service to the external device via the network using the IP address selected by the external device.

12 Claims, 6 Drawing Sheets

FIG. 7

| IP ADDRESS | DEVICE NAME |
|---|---|
| IP1 | DVCR |
| IP2 | DVCR |
| IP3 | DVCR |

COMMUNICATION APPARATUS

BACKGROUND OF THE INVENTION

1. Field of the Invention

The present invention relates to a communication apparatus having a plurality type of network interfaces.

2. Related Background Art

Network technology called UPnP (Universal Plug and Play) has been proposed (Reference Document: Universal Plug and Play Device Architecture, Version 1.0, 08 Jun. 2000). UPnP can configure a network having one or more types of communication media (such as IEEE1394, USB and Bluetooth) by using the IP (Internet Protocol). UPnP prescribes a "device" (hereinafter called a UPnP device) providing one or more services and a "control point" which remotely controls a UPnP device having a predetermined service. A network in conformity with UPnP is hereinafter called a "UPnP network".

With a present UPnP network, however, if a UPnP device has a plurality type of network interfaces, this UPnP device acquires a plurality of IP addresses. It appears therefore as if a plurality of UPnP devices exist on the UPnP network.

FIG. 5 is a diagram illustrating a disadvantage of the present UPnP network. As shown in FIG. 5, if a DVCR (Digital Video Cassette Recorder) as an example of a UPnP device having three kinds of network interfaces (for example, an IEEE1394interface, a USB interface and a Bluetooth interface) participates in an UPnP network, this DVCR acquires three IP addresses in accordance with the procedure prescribed in UPnP. The IEEE1394 interface is a network interface in conformity with IEEE1394-1995 (Reference Document: IEEE Std 1394-1995, IEEE Standard for a High Performance Serial Bus, Institute of Electrical and Electronics Engineers, Inc.), the USB interface is a network interface in conformity with USB (Reference Document: Universal Serial Bus Specification Revision 2.0, Apr. 27, 2000), and the Bluetooth interface is a network interface in conformity with Bluetooth (Reference Document: Specification of the Bluetooth System, version 1.1, Feb. 22, 2001).

In such a case, a DTV (Digital Television Receiver) as an example of a control point assumes that three DVCRs exist on the UPnP network, and displays three DVCR control panels on its screen. FIG. 6 shows an example of a DTV screen. As shown in FIG. 6, three DVCR control panels are displayed on the DTV screen.

A user therefore believes that there are three DVCRs, and operates on each control panel. However, in this case, since only one DVCR exists actually, DVCR cannot operate in the manner intended by the user.

SUMMARY OF THE INVENTION

An object of the present invention is to overcome the above-described drawbacks.

Another object of the present invention is to prevent erroneous operations by a user.

According to a preferred embodiment of the present invention, a communication apparatus for receiving a predetermined service from another apparatus on a network, comprises an extraction unit for extracting information of a proper device capable of providing the predetermined service from information on the apparatus on the network, and list forming means for forming a list of numbers acquired by the proper device included in the information extracted by said extraction unit.

Still other objects, features and advantages of the present invention will become fully apparent from the following detailed description of the preferred embodiments.

BRIEF DESCRIPTION OF THE DRAWINGS

FIG. 7 is a diagram showing the relation between IP addresses and device names of DVCR.

DESCRIPTION OF THE PREFERRED EMBODIMENTS

Preferred embodiments of the present invention will be described with reference to the accompanying drawings.

First Embodiment

The preferred first embodiment of the invention will be described with reference to FIGS. 1 and 2.

Figure 1:
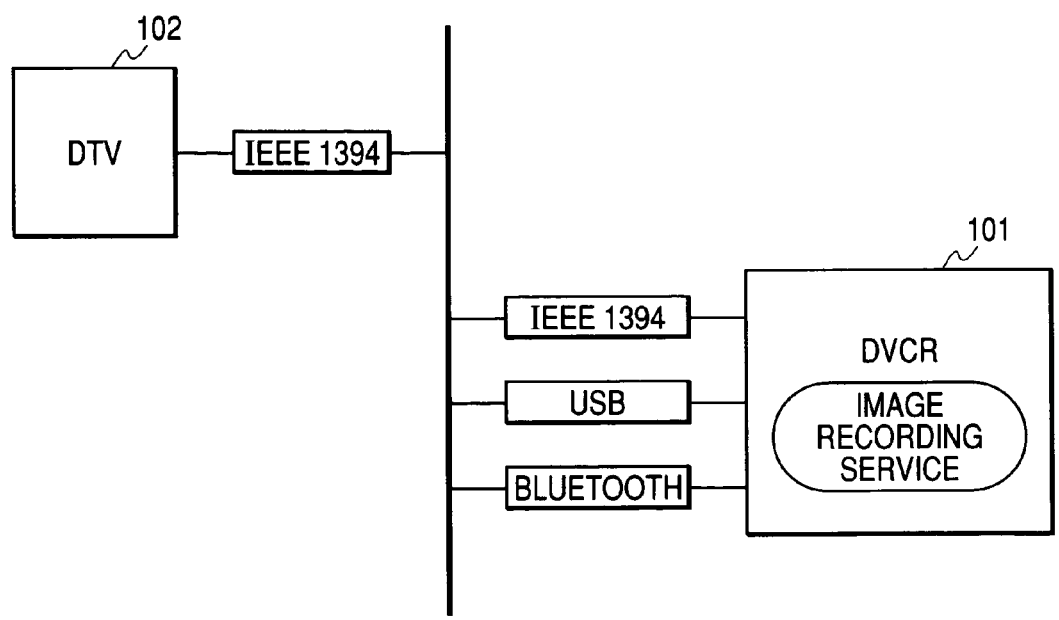
FIG. 1 is a diagram showing an example of the configuration of a UPnP network according to a first embodiment.

FIG. 1 is a diagram showing an example of the configuration of a UPnP network according to a first embodiment. A network shown in FIG. 1 is in conformity with UPnP. A DVCR 101 shown in FIG. 1 is a UPnP device having an image recording service, and is a communication apparatus having an IEEE1394 interface, a USB interface and a Bluetooth interface. A DTV 102 shown in FIG. 1 is a control point which controls the image recording service, and is a communication apparatus having an IEEE1394 interface.

In the first embodiment, description will be made on the case the DVCR 101 participates in the UPnP network via three types of the network interfaces, and acquires three IP addresses in accordance with the procedure prescribed in UPnP. In this case, it appears to DTV 102 as if there are three DVCRs 101 participated in the UPnP network.

In the first embodiment, it is assumed that an IP address IP1 is an IP address acquired when DVCR 101 participates in the network via the IEEE1394 interface, an IP address IP2 is an IP address acquired when DVCR 101 participates in the network via the USB interface, and an IP address IP3 is an IP address acquired when DVCR 101 participates in the network via the Bluetooth interface.

Figure 2:
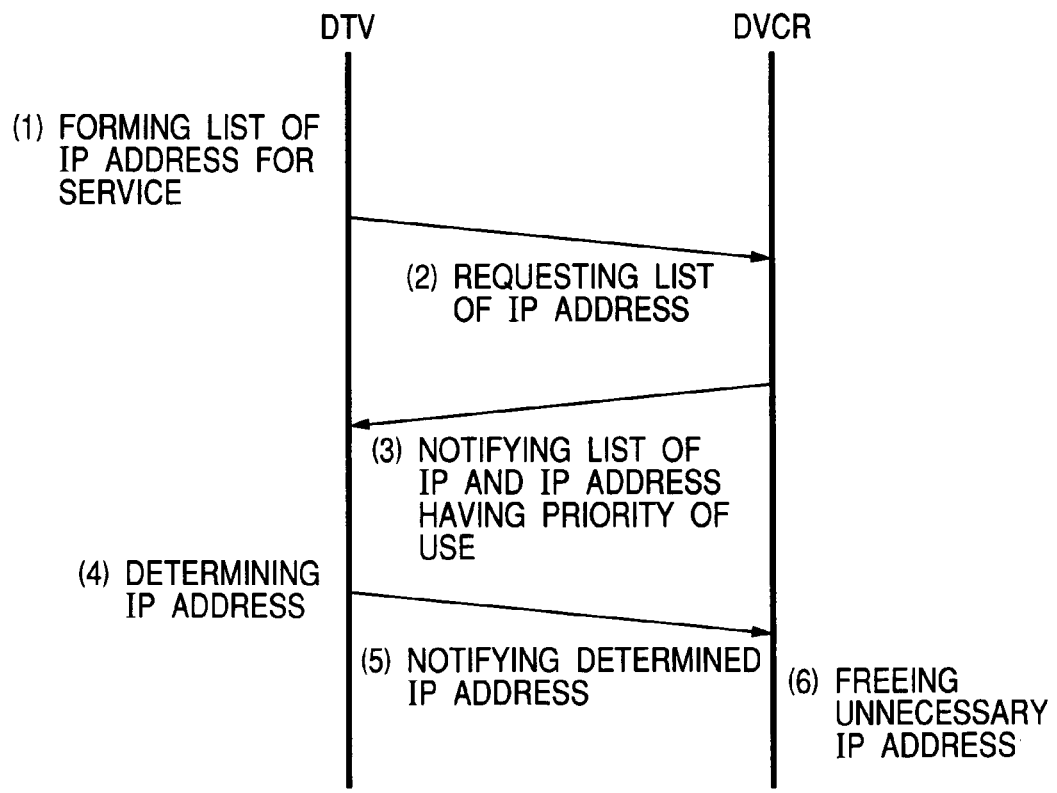
FIG. 2 is a diagram illustrating the processes to be performed in the UPnP network of the first embodiment.

FIG. 2 is a diagram illustrating the processes to be performed in the UPnP network of the first embodiment.

At the control point, a list (hereinafter called an IP address list) of IP addresses of all UPnP devices providing a predetermined service (in the first embodiment, the predetermined service is the image recording service) is formed (Step (1) shown in FIG. 2). Specifically, DTV 102 forms the IP address list of UPnP devices having the image recording service. As shown in FIG. 7, DTV 102 forms the IP address list including three IP addresses.

Next, the control point sends a command to the UPnP device having the IP address on the IP address list in order of the listed IP addresses, to request the UPnP device to return a list of IP addresses possessed by the UPnP device (Step (2)

shown in FIG. 2). Specifically, DTV 102 sends a command to DVCR 101 having the IP address IP1 on the top of the IP address list, to request DVCR 101 to return the list of IP addresses possessed by DVCR 101.

Upon reception of the command, the UPnP device sends back a response indicating the number of acquired IP addresses, the value of each IP address and the IP address to be used with priority (Step (3) shown in FIG. 2). Specifically, Upon reception of the command from DTV 102, DVCR 101 sends back a response indicating that DVCR 101 has three acquired IP addresses which are IP1, IP2 and IP3 and that an IP address to be used with priority is IP1.

The control point determines from the response result the IP address to be used for the service, and deletes the IP addresses different from the determined IP address from the IP address list (Step (4) shown in FIG. 2). Specifically, DTV 102 which received the response understands that the IP addresses IP1, IP2 and IP3 are associated actually with the same DVCR among DVCRs 101 providing the image recording service, determines to use IP1 among three IP addresses, and deletes IP2 and IP3 except IP1 from the IP address list. In this manner, when DTV 102 uses the image recording service, DTV 102 communicates with DVCR 101 for transfer of command and data.

The control point notifies the determined IP address to the UPnP device (Step (5) shown in FIG. 2) Specifically, DTV 102 notifies DVCR 101 of that the DTV 102 uses IP1 for the image recording service.

The UPnP device frees the IP addresses other than the IP address notified to be used (Step (6) shown in FIG. 2). Specifically, DVCR 101 frees IP2 and IP3 except IP1 since IP2 and IP3 are not used thereafter.

As described above, in the first embodiment, the control point is provided with the function of forming an IP address list of UPnP devices providing a predetermined service, inquiring each UPnP device on the IP address list about the list of IP addresses possessed by the UPnP device, and determining from a response to the inquiry an IP address to be used for the service. The UPnP device is provided with the function of responding to the inquiry from the control point by sending back the response indicating the number of acquired IP addresses, the value of each IP address and the IP address to be used with priority, and freeing the IP addresses different from the IP address determined by the control point. An erroneous operation by a user can therefore be avoided.

Second Embodiment

The preferred second embodiment of the invention will be described with reference to FIGS. 3 and 4.

Figure 3:
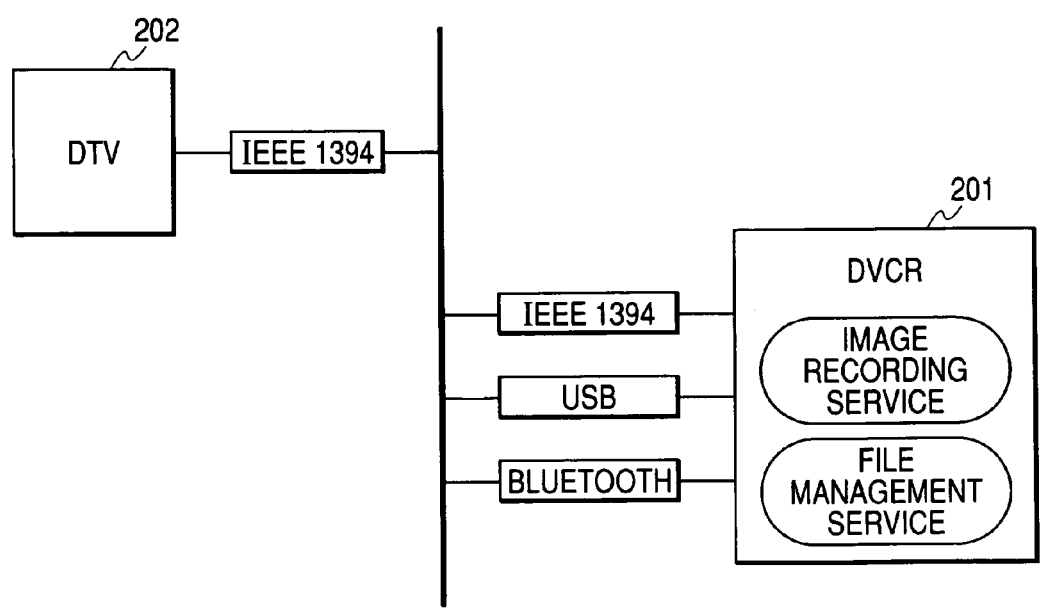
FIG. 3 is a diagram showing an example of the configuration of a UPnP network according to a second embodiment.

FIG. 3 is a diagram showing an example of the configuration of a UPnP network according to a second embodiment. A network shown in FIG. 3 is in conformity with UPnP. A DVCR 201 shown in FIG. 3 is a UPnP device having an image recording service and a file management service, and is a communication apparatus having an IEEE1394 interface, a USB interface and a Bluetooth interface. A DTV 202 shown in FIG. 3 is a control point which controls the image recording service and the file management service, and is a communication apparatus having an IEEE1394 interface.

In the second embodiment, description will be made on the case the DVCR 201 participates in the UPnP network via three types of the network interfaces, and acquires three IP addresses in accordance with the procedure prescribed in UPnP. In this case, it appears to DTV 202 as if there are three DVCRs 201 participated in the UPnP network.

In the second embodiment, it is assumed that an IP address IP1 is an IP address acquired when DVCR 201 participates in the network via the IEEE1394 interface, an IP address IP2 is an IP address acquired when DVCR 201 participates in the network via the USB interface, and an IP address IP3 is an IP address acquired when DVCR 201 participates in the network via the Bluetooth interface.

Figure 4:
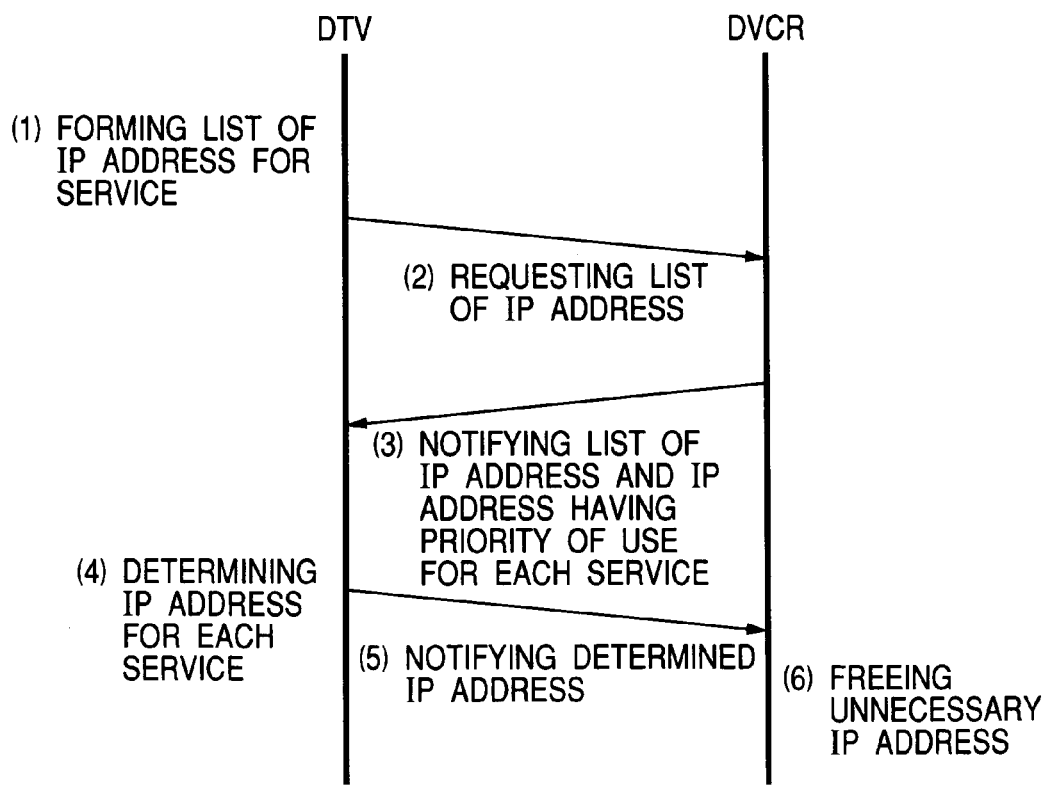
FIG. 4 is a diagram illustrating the processes to be performed in the UPnP network of the second embodiment.
Figure 5:
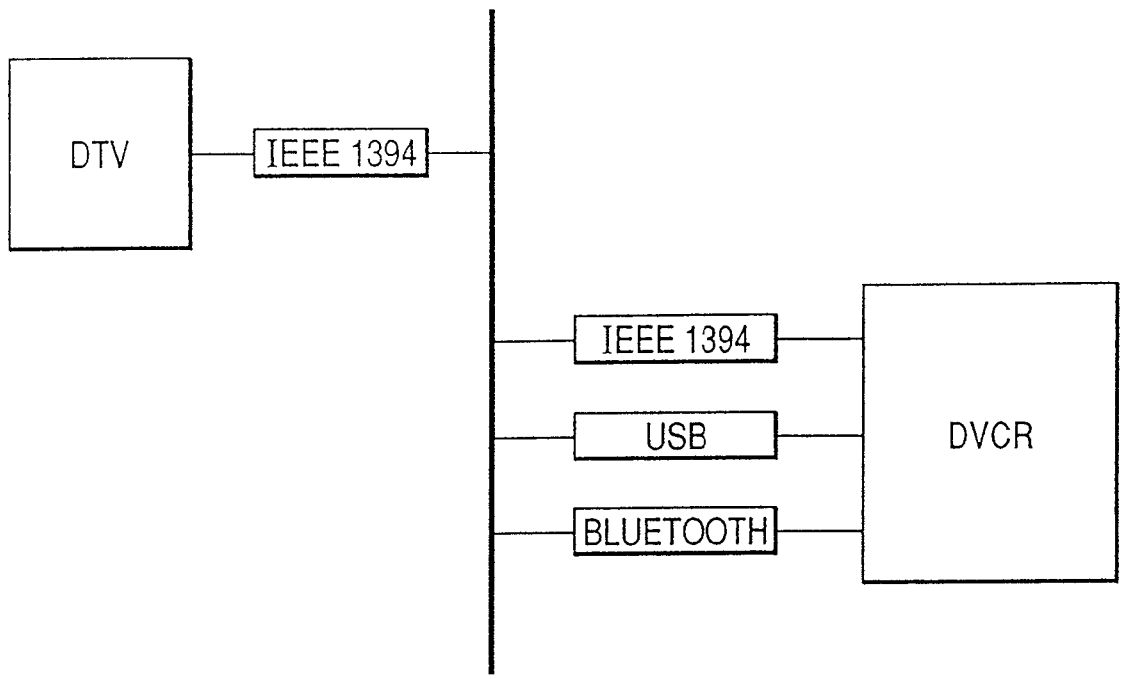
FIG. 5 is a diagram illustrating a disadvantage of a present UPnP network.
Figure 6:
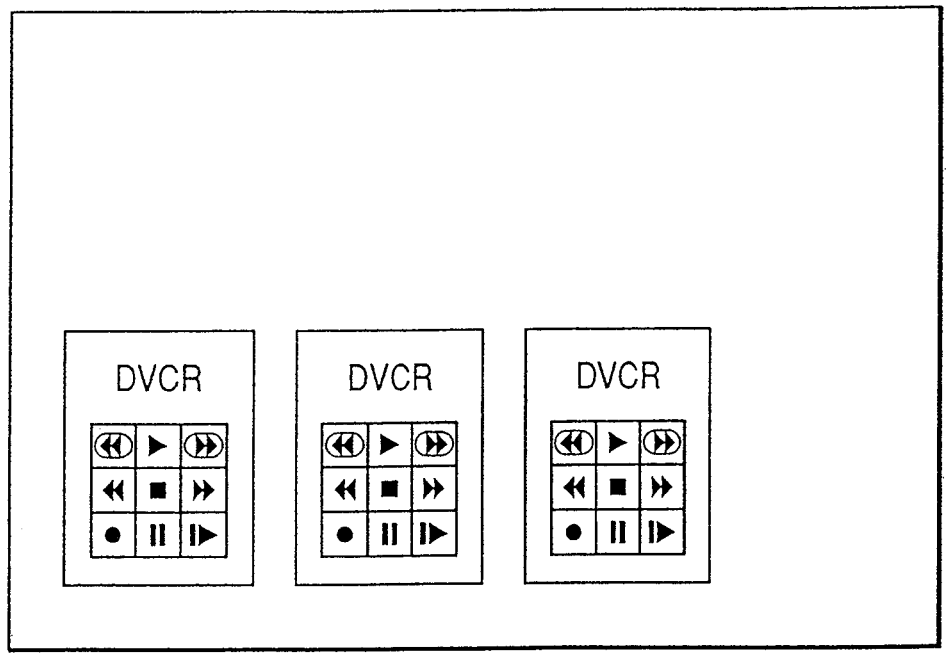
FIG. 6 is a diagram showing an example of a screen of a DTV as an example of a control point.

FIG. 4 is a diagram illustrating the processes to be performed in the UPnP network of the second embodiment.

At the control point, a list (hereinafter called an IP address list) of IP addresses of all UPnP devices providing predetermined services (in the second embodiment, the predetermined services are the image recording service and the file management service) is formed (Step (1) shown in FIG. 4). Specifically, DTV 202 forms the IP address list of UPnP devices having the image recording service and the file management service. As described with the first embodiment, DTV 202 forms the IP address list of three IP addresses.

Next, the control point sends a command to the UPnP device having the IP address on the IP address list in order of the listed IP addresses, to request the UPnP device to return a list of IP addresses possessed by the UPnP device (Step (2) shown in FIG. 4). Specifically, DTV 102 sends a command to DVCR 201 having the IP address IP1 on the top of the IP address list, to request DVCR 201 to return the list of IP addresses possessed by DVCR 201.

Upon reception of the command, the UPnP device sends back a response indicating the number of acquired IP addresses, the value of each IP address and the IP address to be used with priority (Step (3) shown in FIG. 4). Specifically, Upon reception of the command from DTV 202, DVCR 201 sends back a response indicating that DVCR 201 has three acquired IP addresses which are IP1, IP2 and IP3 and that IP addresses to be used with priority are IP1 for the image recording service and IP2 for the file management service.

The control point determines from the response result the IP addresses to be used for the services, and deletes the IP address or addresses different from the determined IP addresses from the IP address list (Step (4) shown in FIG. 4). Specifically, DTV 202 which received the response understands that the IP addresses IP1, IP2 and IP3 are associated actually with the same DVCR among DVCRs 201 providing the image recording service and the file management service, determines to use IP1 and IP2 among three IP addresses, and deletes IP3 except IP1 and IP2 from the IP address list. In this manner, when DTV 202 uses the image recording service and file management service, DTV 202 communicates with DVCR 201 for transfer of command and data via IP1 for the image recording service and IP2 for the file management service.

The control point notifies the determined IP addresses to the UPnP device (Step (5) shown in FIG. 4). Specifically, DTV 202 notifies DVCR 201 of that the DTV 202 uses IP1 for the image recording service and IP2 is used for using the file management service.

The UPnP device frees the IP address other than the IP addresses notified to be used (Step (6) shown in FIG. 4). Specifically, DVCR 201 frees IP3 except IP1 and IP2 since IP3 is not used thereafter.

As described above, in the second embodiment, the control point is provided with the function of forming an IP address list of UPnP devices providing predetermined services, inquiring each UPnP device on the IP address list about the list of IP addresses possessed by the UPnP device, and determining from a response to the inquiry IP addresses to be used for the services. The UPnP device is provided with the function of responding to the inquiry from the control point by sending back the response indicating the number of acquired IP addresses, the value of each IP address and the IP addresses to be used with priority, and freeing the IP address or addresses different from the IP addresses determined by the control point. An erroneous operation by a user can therefore be avoided and the optimum IP addresses can be used for the provision of services.

Other Embodiments

The scope of the invention contains also the case wherein software program codes realizing the function of each embodiment described above are supplied to a computer (CPU or MPU) of an apparatus or system connected to various devices realizing the embodiment function, and the computer operates the devices in accordance with the stored programs.

In this case, the software program codes themselves realize the embodiment function. Therefore, the program codes themselves constitute the present invention. The transmission media for the program codes may be communication media (wired channels such as optical fibers, radio channels and the like of a computer network (WAN such as LAN and the Internet, radio communication network and the like) for supplying program information by using it as a carrier wave.

Means for supplying such program codes, i.e., a recording medium storing the program codes, constitutes the present invention. The record media for storing the program codes may be, for example, a flexible disk, a hard disk, an optical disk, a magneto optical disk, a CD-ROM, a magnetic tape, a nonvolatile memory card, a ROM or the like.

It is obvious that the program codes are included in the embodiment of the invention, wherein not only the computer executes the supplied program codes to realize the embodiment function but also the program codes in cooperation with an OS (operating system) running on the computer or with another application or the like realize the embodiment function.

It is obvious that the scope of the invention also contains the case wherein the functions of each embodiment can be realized by writing the program codes into a memory of a function expansion board inserted into a computer or of a function expansion unit connected to the computer, and thereafter by executing a portion or the whole of actual processes by a CPU of the function expansion board or function expansion unit.

The above-described preferred embodiments are merely exemplary of the present invention, and are not to be construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

What is claimed is:

1. A communication apparatus that provides a service to an external device via a network, comprising:
a plurality of network connection units that are connected to the network; and
a control unit that (a) notifies the external device of a plurality of IP addresses assigned respectively to the plurality of network connection units so that the external device can select one of the plurality of IP addresses, and (b) releases the plurality of IP addresses except an IP address selected by the external device so that the communication apparatus can provide a service to the external device via the network using the IP address selected by the external device.

2. The communication apparatus according to claim 1, wherein the control unit notifies the external device which of the plurality of IP addresses has priority for the service.

3. The communication apparatus according to claim 1, wherein the service includes an image recording service.

4. The communication apparatus according to claim 1, wherein the service includes a file management service.

5. The communication apparatus according to claim 1, wherein the network conforms to UPnP (Universal Plug and Play).

6. The communication apparatus according to claim 5, wherein the external device is a control point on the network.

7. A method of controlling a communication apparatus that provides a service to an external device via a network, the communication apparatus including a plurality of network connection units connected to the network, the method performed by the communication apparatus and comprising the steps of:
notifying the external device of a plurality of IP addresses assigned respectively to the plurality of network connection units so that the external device can select one of the plurality of IP addresses; and
releasing the plurality of IP addresses except an IP address selected by the external device so that the communication apparatus can provide a service to the external device via the network using the IP address selected by the external device.

8. The method according to claim 7, further comprising the step of notifying the external device which of the plurality of IP addresses has priority for the service.

9. The method according to claim 7, wherein the service includes an image recording service.

10. The method according to claim 7, wherein the service includes a file management service.

11. The method according to claim 7, wherein the network conforms to UPnP (Universal Plug and Play).

12. The method according to claim 11, wherein the external device is a control point on the network.

* * * * *